United States Patent [19]
Gillham et al.

[11] B  3,983,698
[45] Oct. 5, 1976

[54] INTERNAL COMBUSTION ROTARY ENGINE OXIDIZING FLUID INJECTION ARRANGEMENT

[75] Inventors: Ronald F. Gillham, Huntington Woods; Paul D. Stevenson, Ann Arbor, both of Mich.

[73] Assignee: General Motors Corporation, Detroit, Mich.

[22] Filed: Sept. 3, 1974

[21] Appl. No.: 502,540

[44] Published under the second Trial Voluntary Protest Program on January 13, 1976 as document No. B 502,540.

[52] U.S. Cl. .................................. 60/304; 60/901; 123/8.45
[51] Int. Cl.² ...................................... F02B 75/10
[58] Field of Search ............ 60/901, 304, 282, 305; 123/8.45

[56] References Cited
UNITED STATES PATENTS

| | | | |
|---|---|---|---|
| 2,295,436 | 9/1942 | Tendler | 60/305 |
| 3,468,124 | 9/1969 | Hraboweckyj | 60/305 |
| 3,635,031 | 1/1972 | Haddad | 60/282 |
| 3,710,575 | 1/1973 | Lamm | 60/901 |
| 3,817,220 | 6/1974 | Brumm | 60/901 |

Primary Examiner—Douglas Hart
Attorney, Agent, or Firm—Ronald L. Phillips

[57] ABSTRACT

An internal combustion rotary engine oxidizing fluid injection arrangement having a sheet metal liner that is mounted in the engine's exhaust passage and has injection ports through which oxidizing fluid is injected into the exhaust gas in directions transverse to the flow thereof.

2 Claims, 7 Drawing Figures

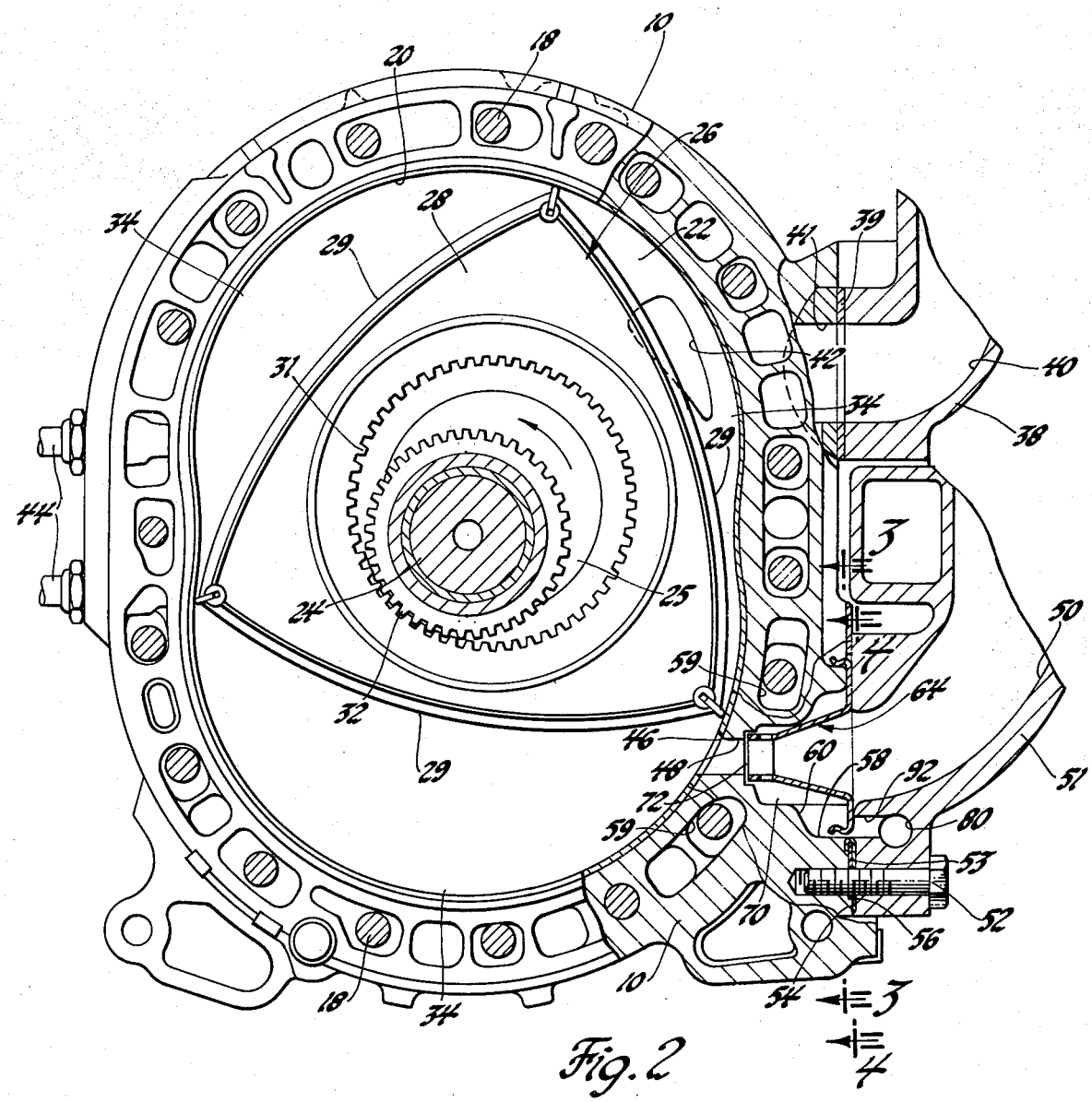
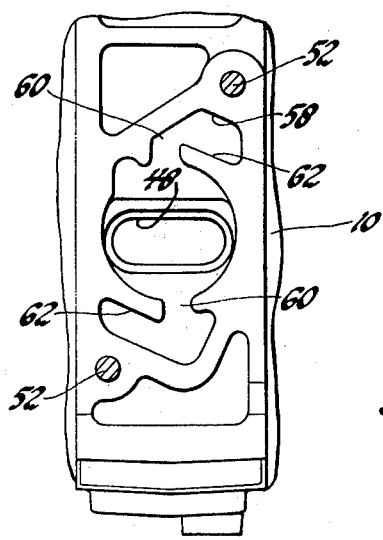
Fig. 2
Fig. 3

INTERNAL COMBUSTION ROTARY ENGINE OXIDIZING FLUID INJECTION ARRANGEMENT

This invention relates to an internal combustion rotary engine oxidizing fluid injection arrangement and more particularly to such an arrangement wherein the oxidizing fluid is injected into the exhaust gas through a liner mounted in the exhaust passage.

In internal combustion rotary engines, as in internal combustion reciprocating engines, oxidizing fluid such as air can be injected into the exhaust gas to promote burning of partially burned and unburned compounds and also to promote oxidation of certain constituents to effect reduction in undesirable emissions. Typically, in reciprocating piston engines the oxidizing fluid is introduced through a nozzle adjacent the downstream side of each exhaust valve where the temperature is sufficiently high so that further combustion can occur spontaneously. In rotary engines, however, the exhaust temperatures are normally considerably higher and there is no exhaust valve shielding available for the nozzle as in a reciprocating piston engine. From an engineering and manufacturing standpoint, it is desirable that very early injection be accomplished without requiring higher temperature resistance properties for the injection device or complicated engine modifications and methods of assembly.

An object of the present invention is to provide a new and improved oxidizing fluid injection arrangement for internal combustion rotary engines providing injection through a liner in the engine's internal exhaust passage immediately downstream of the exhaust port.

Another object is to provide in an internal combustion rotary engine an oxidizing fluid injection arrangement having a liner in the exhaust passage through which the oxidizing fluid is directed via ports therein into the exhaust gas in a direction transverse to the flow thereof.

Another object is to provide in an internal combustion rotary engine an oxidizing fluid injection arrangement having a liner in the exhaust passage through which the oxidizing fluid is directed via ports therein into the exhaust gas in a direction transverse to the flow thereof while the liner also acts to warm the oxidizing fluid to avoid quenching and reduce the heat transfer to the engine housing.

These and other objects of the present invention will be more apparent from the following description and drawing in which:

FIG. 2 is an enlarged view taken along the line 2—2 in FIG. 1.

FIG. 3 is a view taken along the line 3—3 in FIG. 2 with the exhaust passage liner removed.

Figure 1:
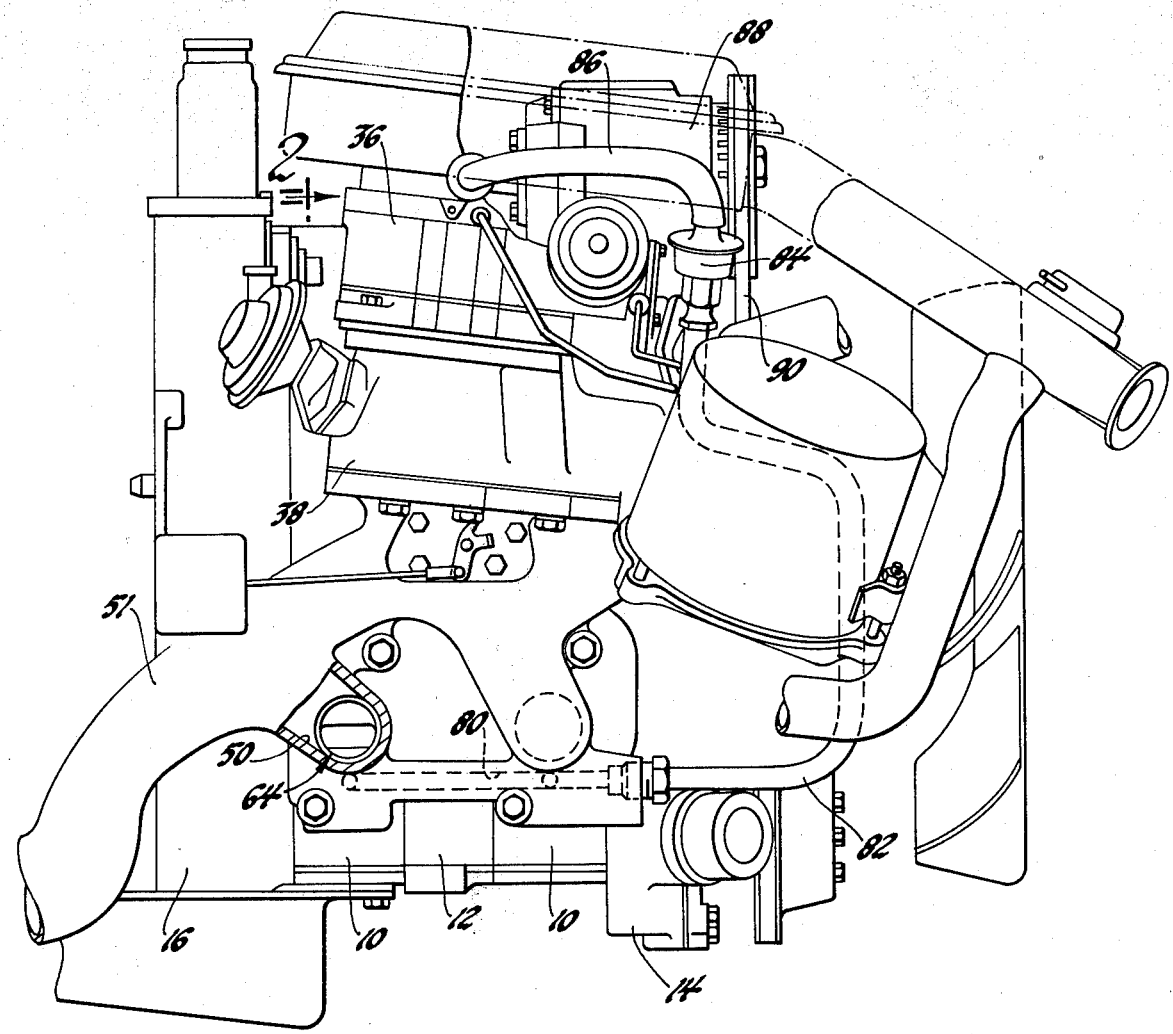
FIG. 1 is an exhaust-side elevational view of an internal combustion rotary engine having an oxidizing fluid injection arrangement according to the present invention.

The oxidizing fluid injection arrangement according to the present invention is readily suited for the internal combustion rotary engine shown in FIGS. 1 and 2 which generally comprises in the case of two-rotor engine a stationary body having a pair of identical rotor housings 10, an intermediate housing 12, a front housing 14 and a rear housing 16 which are all secured together by bolts 18. Each of the rotor housings 10 has a two-lobed internal peripheral wall 20 as shown in FIG. 2 and there are provided oppositely facing walls 22 at the interfaces of the intermediate housing 12 and the front housing 14 in one case and the intermediate housing 12 and the rear housing 16 in the other case that cooperate with the respective peripheral walls to define a pair of cavities. A crankshaft 24 is rotatably mounted near its opposite ends in the front and rear housings 14 and 16 and has eccentrics 25 located in the respective cavities, these eccentrics being angularly spaced 180° apart. A three-lobed rotor 26 is rotatably mounted on each eccentric 25 and has two parallel sides 28 opposite the respective end walls and three peripheral faces 29 opposite the respective peripheral walls. Each rotor 26 has an internal tooth gear 31 on the outboard side whose center is on the rotor axis and whose teeth mesh with an annular external tooth gear 32 which is freely received about and concentric with the crankshaft and is secured to the engine's stationary body, the stationary gear 32 for the front rotor being secured to the front housing 14 and the other stationary gear 32 for the rear rotor being secured to the rear housing 16. The internal tooth rotor gears 31 have one and one-half times the number of teeth as the stationary gears 32 with the result that the rotors and the crankshaft turn in a fixed speed relationship while the rotors planetate with a fixed relationship to the rotor housing with the rotors turning at one-third the speed of the crankshaft and the rotors phased 60° apart. The rotor faces 29 and the housing walls 20 and 22 cooperate to provide three working chambers 34 that are spaced about and move with the respective rotors within the respective rotor housings while varying in volume as the rotors planetate, there being provided suitable gas seals on the rotors as shown in FIG. 2 to seal these chambers from each other.

Describing now the induction system, a carburetor 36 delivers a combustible air-fuel mixture to an intake manifold 38. The intake manifold 38 is bolted or clamped to the intermediate and end housings 12, 14 and 16 with a gasket 39 between the interfaces and has internal passages 40 which communicate with intake passages 41 in the intermediate and end housings, the intake passages 41 terminating in side intake ports 42 that are located opposite each other in the respective end walls. Upon rotor rotation in the direction indicated by the arrow in FIG. 2, the air-fuel mixture is sequentially, periodically admitted to the working chambers 34 as they are expanding by the traversing motion of the rotor sides relative to the intake ports whereafter the chambers then close to their intake ports and contract to compress the thus trapped mixture in readiness for ignition. Combustion by spark ignition is provided by an ignition system which has two spark plugs 44 mounted in each of the rotor housings to ignite the mixture in each chamber. Sequential ignition of the air-fuel mixture in the chambers is effected by the spark plugs receiving timed ignition pulses from a distributor, not shown, which is driven by the crankshaft 24. The electrodes of the spark plugs are open to the chambers through the rotor housing's internal peripheral wall 20 and are peripherally spaced thereabout so that one plug is said to lead the other, the spark plugs being fired according to certain engine operating conditions as is well known. With combustion, the peripheral wall takes the reaction to force the rotor to continue rotating and eventually each working chamber following the power phase is exhausted during the exhaust phase through an exhaust port 46 to a diverging exhaust passage 48 in the respective rotor housing. Each exhaust passage 48 directs the exhaust gas to a passage 50 in an exhaust manifold 51 that is secured by bolts 52 to the rotor housings 10 with a gasket 53 disposed between the respective manifold and rotor housing interfaces 54 and 56. As shown in FIGS. 1–4, the exhaust port 46 in the rotor housings is oval shaped as viewed in cross-section across the flow path and the contiguous exhaust passage 48 is tapered and increases in cross-sectional or flow area as it projects radially outward of the rotor housing. Furthermore, the rotor housing has axial flow coolant passages 59 on both sides of the exhaust passage 48 as shown in FIG. 2.

The details of the engine structure thus far described are conventional and injection of oxidizing fluid such as air is normally provided by injecting the air through a tube into the exhaust passage 48 in the rotor housing. However, according to the present invention there is provided an oxidizing fluid injection arrangement wherein oxidizing fluid such as air is injected into the rotor housing exhaust passage 48 close to or adjacent the exhaust port 46 and in a direction transverse to the flow of the exhaust gas. According to the present invention, each of the exhaust passages 48 is provided with a liner accommodating recess 58 having a generally treble clef shape at the rotor housing interface 56 with the exhaust passage forming the central portion thereof as shown in FIG. 3 and the recess extending with an annular shape into the rotor housing about two-thirds the length of the exhaust passage as shown in FIG. 2. In this form there are two oppositely extending arms 60 of the recess that have liner locating faces 62 which are on opposite sides of the exhaust passage 48 and at right angles to a plane passing through the center of the exhaust passage and the centers of the two exhaust manifold attaching bolts 52.

Figure 7:
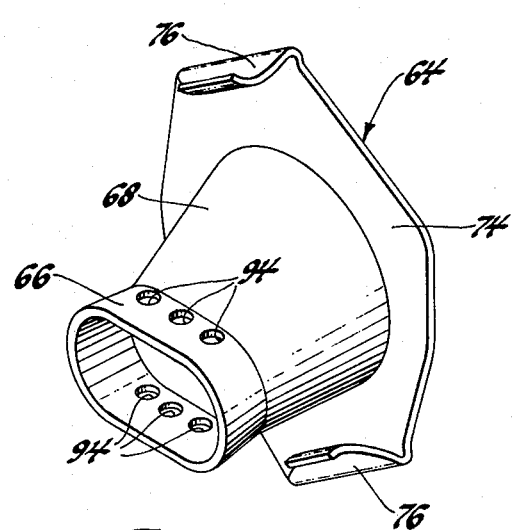
FIG. 7 is an enlarged perspective view of the exhaust passage liner.
Figure 6:
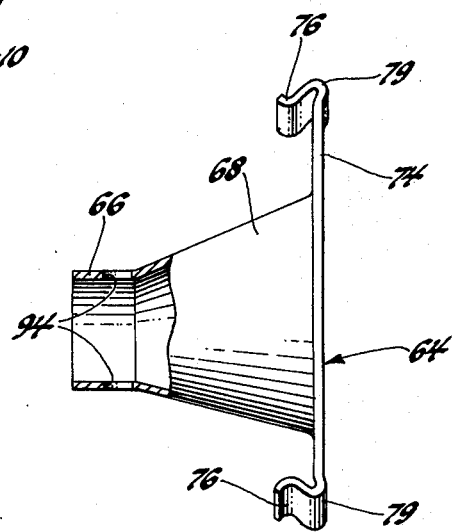
FIG. 6 is an enlarged side elevational view of the exhaust passage liner.

A stamped one piece sheet metal liner 64 is received in each of the exhaust passage recesses 58 as best shown in FIGS. 2, 6 and 7 and has a gas passage section that conforms in shape to the normal configuration of the exhaust passage 48. The gas passage section of the liner has an oval shaped throat portion 66 that aligns with the exhaust passage close to the inner end of the recess 58 and an expanding tapered or flared portion 68 of increasing flow area that continues to and terminates with a circular shape at the rotor housing interfaces 56. In addition, the outer surface of the gas passage section of the liner is made undersize relative to the accommodating recess so that there is both an annular clearance or chamber 70 and an end clearance 72 between the liner and rotor housing to provide for passage of the oxidizing fluid as will be described in more detail later.

Figure 5:
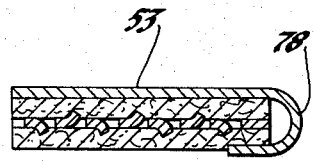
FIG. 5 is an enlarged view taken along the line 5—5 in FIG. 4.
Figure 4:
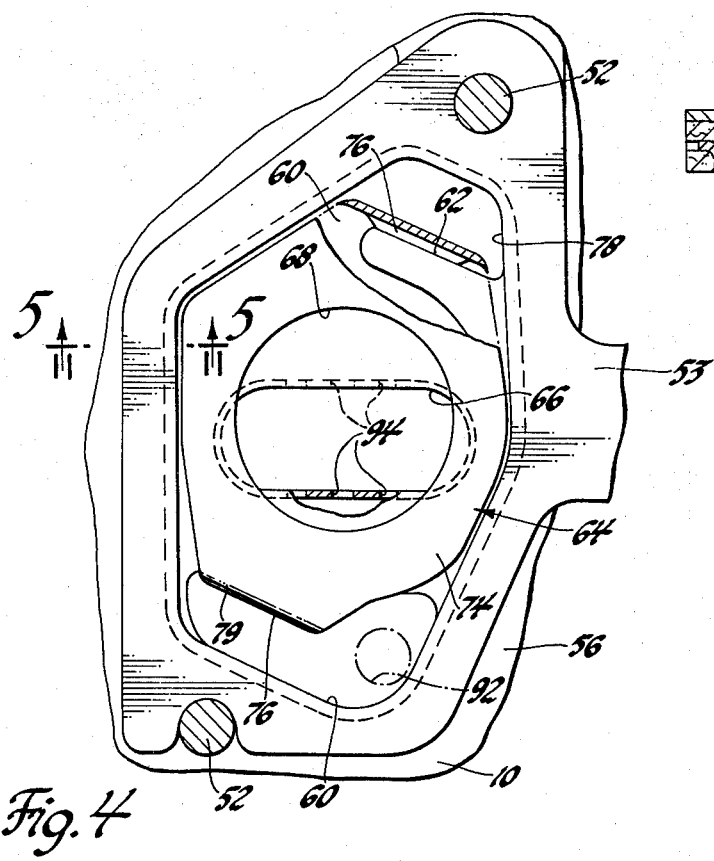
FIG. 4 is an enlarged view taken along the line 4—4 in FIG. 2.

The liner 64 is accurately located in the recess 58 with the desired clearance by being provided with an annular flange 74 having a pair of outwardly located fingers 76 that depend towards the throat end. The exhaust manifold gasket 53, which is of laminar sheet metal and heat resistant material construction as shown in FIG. 5, has an opening 78 for each liner 64 as shown in FIG. 4 such that the flange 74 fits directly between the exhaust manifold and rotor housing interfaces 54 and 56 and is clamped thereby on tightening the manifold bolts 52 with the gasket 53 yielding to allow this metal-to-metal contact for precise control of the end clearance 72. Thus, the annular flange 74 also serves as a heat barrier to protect the gasket 53 from direct exposure to the hot exhaust gas. For this clamping of the liner 64 the fingers 76 are provided with small raised corners 79 as best shown in FIG. 6 which act as springs against the exhaust manifold interface 54 to clamp the liner in place but still allow the major clamping load of the exhaust manifold 51 to act on the exhaust manifold gasket 53 that surrounds the liner 64. In addition, the fingers 76 grab the oppositely facing locating faces 62 of the exhaust passage recess 58 as shown in FIGS. 2 and 4 so that the liner 64 is piloted so as to be clamped in proper position to provide the desired annular chamber 70.

Oxidizing fluid is delivered by providing the exhaust manifold 51 with a drilled hole or passage 80 which extends longitudinally thereof on the lower side so as to span the exhaust passages and the two rotor housings and is connected at its open end through a pipe 82, a check valve 84 and a hose 86 to an air pump 88 that is driven through a belt and pulley arrangement 90 by the engine crankshaft as shown in FIG. 1. As shown in FIG. 2, a branch passage 92 is drilled through the interface 54 of the exhaust manifold 51 to connect the longitudinal passage 80 with the lower arm 60 of each liner recess 58 outward of the liner flange 74 so that the air is delivered to the annular chamber 70 about each liner 64 and thus also to the end clearance 72 but is prevented from passing between the manifold and rotor housing interfaces into the exhaust passageway. The air is delivered into the exhaust gas from annular chamber 70 by a plurality of injection ports 94 in opposite sides of the contracting throat portion 66 of the liner as shown in FIGS. 2, 4, 6 and 7. The ports 94 direct the air in directions transverse to the passing gas just after the gas has exited from the exhaust port 46 to thereby promote good and early mixing so that spontaneous combustion can occur early in the exhaust passage 48 in the rotor housing 10 and thereafter continue into the exhaust manifold 51. Furthermore, some air passes through the end clearance 72 into the exhaust gas and also in directions transverse thereto to provide an earlier start to the mixing.

In addition to providing the desired early induction of air into the exhaust gas at an angle that provides for good mixing, the exhaust passage liner 64 also provides for warming the injected air to reduce the quench affect of the relatively cool air on the exhaust gas and acts as a heat barrier to protect the rotor housing 10 from excessive temperatures. With the cool injected air passing over the very hot liner 64 on the way to mixing with the exhaust gas by entering through the injection ports 94 and also through the end clearance 72, the heat transfer from the hot liner to the air causes the air temperature to rise prior to such mixing. This results in less localized cooling of the exhaust gas and thereby enables better oxidizing reactions by the higher exhaust gas temperatures. Furthermore, as the air is being injected, the liner 64 acts to keep the exhaust gas away from the rotor housing along a major portion of the exhaust passage's length. This reduces the thermal expansion of the rotor housing and the heat transfer to the coolant and even when no air is being injected for emission control, the liner still acts to keep the high velocity exhaust gas off the rotor housing and instead allows only relatively stagnant gas to contact therewith with resultantly low heat transfer. Furthermore, it will be appreciated that the end clearance 72 between the nose of the liner and the rotor housing allows for thermal expansion of the liner as well as the injection air flow.

The above described embodiment is illustrative of the invention which may be modified within the scope of the appended claims.

We claim:

1. An internal combustion rotary engine having a stationary body comprising a rotor housing having a mutli-lobed internal peripheral wall and a pair of end wall housings having oppositely facing internal end walls cooperatively defining a cavity, a crankshaft rotatably mounted in said stationary body having an eccentric located in said cavity, a multi-lobed rotor rotatably mounted on said eccentric having sides opposite said end walls and a plurality of peripheral faces opposite said peripheral wall, means for causing said rotor and said crankshaft to turn in a fixed speed relationship while said rotor planetates with a fixed relationship to said rotor housing, said rotor faces and housing walls cooperating to provide a plurality of working chambers that are spaced about and move with said rotor within said rotor housing while varying in volume as said rotor planetates, said stationary body having an intake passage that is opened by said rotor to said chambers as they expand to deliver gas thereto, said rotor housing having an exhaust passage with a port at one end at said peripheral wall that is opened by said rotor to said working chambers during their contraction to receive exhaust gas therefrom and at the other end terminates at an external interface on said rotor housing, an exhaust manifold secured to said stationary body with an interface opposite said rotor housing interface, said exhaust manifold having a manifold passage registering with said exhaust passage in said rotor housing, a gasket arranged between said exhaust manifold and said rotor housing having an opening aligning with said manifold passage and said exhaust passage, means for securing said exhaust manifold to said rotor housing while clamping said gasket between said interfaces to seal the juncture of said manifold passage and said exhaust passage, said exhaust passage having a liner recess extending through said rotor housing interface and about said exhaust passage from an outer end at said other end of said exhaust passage to an inner end at an intermediate point along the length of said exhaust passage, a sheet metal exhaust passage liner having a gas passage section received in said recess that conforms in shape to the normal configuration of said exhaust passage, said gas passage section having an inner end that is spaced with a predetermined end clearance from said rotor housing at said inner end of recess and having an external surface that is spaced with a predetermined annular clearance thereabout from said rotor housing to provide an annular chamber between said liner and said rotor housing, said liner further having an annular flange at an outer end that is located in the opening of said gasket and is clamped directly between said interfaces of said rotor housing and said manifold to hold said liner in place while accurately determining said end clearance, said flange having outwardly located fingers that engage said rotor housing in said recess to accurately determine said annular clearance, said gas passage section of said liner having a throat portion adjacent said inner end of said recess, said throat portion having a plurality of peripherally spaced injection ports therethrough downstream of said end clearance, an oxidizing fluid supply passage in said exhaust manifold open through said opening in said gasket to said liner recess at said interfaces of said rotor housing and said exhaust manifold for delivering oxidizing fluid to said annular chamber whereby oxidizing fluid is delivered through said injection ports and also said end clearance to the exhaust gas flowing through said exhaust passage in directions transverse to the flow thereof while said liner also provides for warming of the oxidizing fluid prior to its injection into the exhaust gas and acts as a heat barrier between the exhaust gas and the rotor housing.

2. An internal combustion rotary engine having a stationary body comprising a rotor housing having a multi-lobed internal peripheral wall and a pair of end wall housings having oppositely facing internal end walls cooperatively defining a cavity, a crankshaft rotatably mounted in said stationary body having an eccentric located in said cavity, a multi-lobed rotor rotatably mounted on said eccentric having sides opposite said end walls and a plurality of peripheral faces opposite said peripheral wall, means for causing said rotor and said crankshaft to turn in a fixed speed relationship while said rotor planetates with a fixed relationship to said rotor housing, said rotor faces and housing walls cooperating to provide a plurality of working chambers that are spaced about and move with said rotor within said rotor housing while varying in volume as said rotor planetates, said stationary body having an intake passage that is opened by said rotor to said chambers as they expand to deliver gas thereto, said rotor housing having an exhaust passage with a port at one end at said peripheral wall that is opened by said rotor to said working chambers during their construction to receive exhaust gas therefrom and at the other end terminates at an external interface on said rotor housing, an exhaust manifold secured to said stationary body with an interface opposite said rotor housing interface, said exhaust manifold having a manifold passage registering with said exhaust passage in said rotor housing, a gasket arranged between said exhaust manifold and said rotor housing having an opening aligning with said manifold passage and said exhaust passage, means for securing said exhaust manifold to said rotor housing while clamping said gasket between said interfaces to seal the juncture of said manifold passage and said exhaust passage, said exhaust passage having a liner recess extending through said rotor housing interface and about said exhaust passage from an outer end at said other end of said exhaust passage to an inner end at an intermediate point along the length of said exhaust passage, a sheet metal exhaust passage liner having a gas passage section received in said recess that conforms in shape to the normal configuration of said exhaust passage, said gas passage section having an inner end that is spaced with a predetermined end clearance from said rotor housing at said inner end of said recess and having an external surface that is spaced with a predetermined annular clearance thereabout from said rotor housing to provide an annular chamber between said liner and said rotor housing, said liner further having an annular flange at an outer end that is located in the opening of said gasket and is clamped directly between said interfaces of said rotor housing and said manifold to hold said liner in place while accurately determining said end clearance, said flange having outwardly located fingers that engage said rotor housing in said recess to accurately determine said annular clearance, an oxidizing fluid supply passage in said exhaust manifold open through said opening in said gasket to said liner recess at said interfaces of said rotor housing and said exhaust manifold for delivering oxidizing fluid to said annular chamber whereby oxidizing fluid is delivered through said end clearance to the exhaust gas flowing through said exhaust passage in directions transverse to the flow thereof while said liner also provides for warming of the oxidizing fluid prior to its injection into the exhaust gas and acts as a heat barrier between the exhaust gas and the rotor housing.

* * * * *

UNITED STATES PATENT AND TRADEMARK OFFICE
CERTIFICATE OF CORRECTION

PATENT NO. : 3,983,698
DATED : October 5, 1976
INVENTOR(S) : Ronald F. Gillham, Paul D. Stevenson It is certified that error appears in the above–identified patent and that said Letters Patent are hereby corrected as shown below:

Column 2, line 7, before "walls" insert -- end --.
Column 5, line 56, before "recess" insert -- said --.
Column 6, line 36, "construction" should read -- contraction --

Signed and Sealed this

Fourth Day of January 1977

[SEAL]

Attest:

RUTH C. MASON
Attesting Officer

C. MARSHALL DANN
Commissioner of Patents and Trademarks